United States Patent
Townsend et al.

(10) Patent No.: US 11,679,366 B2
(45) Date of Patent: Jun. 20, 2023

(54) VACUUM CHAMBER, FEEDTHROUGH SYSTEM FOR VACUUM CHAMBER AND METHODS

(71) Applicant: Sidus Space, Inc., Merritt Island, FL (US)

(72) Inventors: Ivan Townsend, Kennedy Space Center, FL (US); Jason Schuler, Kennedy Space Center, FL (US); Robert Cox, Kennedy Space Center, FL (US)

(73) Assignee: Sidus Space, Inc., Merritt Island, FL (US)

( * ) Notice: Subject to any disclaimer, the term of this patent is extended or adjusted under 35 U.S.C. 154(b) by 0 days.

(21) Appl. No.: 17/657,677

(22) Filed: Apr. 1, 2022

(65) Prior Publication Data

US 2022/0219130 A1 Jul. 14, 2022

Related U.S. Application Data

(63) Continuation of application No. 17/133,744, filed on Dec. 24, 2020, now Pat. No. 11,511,249.

(51) Int. Cl.
*B01J 3/00* (2006.01)
(52) U.S. Cl.
CPC ..................... *B01J 3/006* (2013.01)
(58) Field of Classification Search
CPC ....................................................... B01J 3/006
USPC ............................................................. 34/92
See application file for complete search history.

(56) References Cited

U.S. PATENT DOCUMENTS

| | | | | |
|---|---|---|---|---|
| 3,635,607 A * | 1/1972 | Grise | ................... | F04B 43/0063 417/394 |
| 4,127,947 A * | 12/1978 | Webb | ................. | F26B 7/00 34/92 |
| 4,154,434 A * | 5/1979 | Wallis | ...................... | F16J 15/52 92/158 |
| 4,278,114 A * | 7/1981 | Ruberg | ................. | A23L 3/0155 53/103 |
| 7,441,747 B2 * | 10/2008 | Chen | ..................... | F16K 3/0254 251/193 |
| 9,790,933 B2 * | 10/2017 | Park | ........................ | F04B 9/14 |
| 10,919,014 B2 * | 2/2021 | Townsend | ................. | B01J 3/02 |
| 11,377,276 B2 * | 7/2022 | Mueller | .................... | F26B 5/06 |
| 11,511,249 B2 * | 11/2022 | Townsend | ................. | B01J 3/03 |
| 2002/0179586 A1 * | 12/2002 | Wengert | ............ | C23C 16/45502 219/390 |

(Continued)

*Primary Examiner* — Stephen M Gravini
(74) *Attorney, Agent, or Firm* — Mark Malek; Jonathan D Staudt; Widerman Malek, PL

(57) ABSTRACT

A vacuum chamber may include an ambient side and a vacuum side. The vacuum chamber may be configured to carry a feedthrough that may include a hollow tube, a first O-ring captured by a first recess within the hollow tube and a rod extending through the hollow tube. The outer circumference of the rod may be configured to contact an entirety of an inner circumference of the first O-ring. A vacuum fitting having an inner circumference may be fixedly secured to the hollow tube. The rod may be operable to be linearly movable within the hollow tube and may be rotatably movable about an axis within the hollow tube. An object may be secured to the rod and may be linearly and rotatably moved within the vacuum chamber.

27 Claims, 1 Drawing Sheet

(56) References Cited

U.S. PATENT DOCUMENTS

| | | | |
|---|---|---|---|
| 2014/0058361 A1* | 2/2014 | Gordon | A61B 17/3203 606/115 |
| 2022/0013313 A1* | 1/2022 | Yoshitomo | H02B 13/045 |
| 2022/0219130 A1* | 7/2022 | Townsend | B01J 3/006 |

* cited by examiner

VACUUM CHAMBER, FEEDTHROUGH SYSTEM FOR VACUUM CHAMBER AND METHODS

RELATED APPLICATIONS

This application is a continuation application of and claims priority under 35 U.S.C. § 120 of U.S. patent application Ser. No. 17/133,744 filed on Dec. 24, 2020 and titled HIGH-LOAD VACUUM CHAMBER MOTION FEEDTHROUGH SYSTEMS AND METHODS, which in turn is a continuation application of and claims priority under 35 U.S.C. § 120 of U.S. patent application Ser. No. 16/378,042, now U.S. Pat. No. 10,919,014, issued Feb. 16, 2021 filed on Apr. 8, 2019 and titled HIGH-LOAD VACUUM CHAMBER MOTION FEEDTHROUGH SYSTEMS AND METHODS, which in turn claims priority under 35 U.S.C. § 119(e) of U.S. Provisional Patent Application Ser. No. 62/654,971 filed on Apr. 9, 2018 and titled HIGH-LOAD VACUUM CHAMBER MOTION FEEDTHROUGH SYSTEMS AND METHODS. The contents of these applications are incorporated herein by reference.

GOVERNMENT INTEREST

The invention described herein was made in the performance of work under a NASA contract NNK11EA08C and by employees of the United States Government and is subject to the provisions of Public Law 96-517 (35 U.S.C. § 202) and may be manufactured and used by or for the Government for governmental purposes without the payment of any royalties thereon of therefore.

FIELD OF THE INVENTION

The present invention relates to high-load vacuum chamber motion feed through systems and methods and, more specifically, to manipulating items both rotationally and linearly within a vacuum chamber.

BACKGROUND OF THE INVENTION

Vacuum chambers and feedthroughs are well known in the art. Traditional vacuum feedthroughs may allow a user to manipulate one or more items contained within the vacuum chamber. However, no known feedthrough provides for both linear and rotary manipulation of a device from outside the vacuum chamber while also providing a high load capacity. Therefore, a need exists for a low cost feedthrough device, which provides for both linear and rotary manipulation of a device within a vacuum chamber, which is not required to function at a high vacuum level.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a vacuum chamber having an ambient side and a vacuum side. The vacuum chamber may be configured to carry a feedthrough. The feedthrough may include a hollow tube having a length, an inner circumference, and a first recess located within the inner circumference. The feedthrough may also include a first O-ring captured by the first recess within the hollow tube, and a rod extending through an entirety of the length of the hollow tube. An outer circumference of the rod may be configured to contact an entirety of an inner circumference of the first O-ring.

The feedthrough may further include a vacuum fitting that may have an inner circumference fixedly secured to the hollow tube, and an outer circumference fixedly secured to the vacuum chamber. The rod may be operable to be linearly movable within the hollow tube between the ambient side of the vacuum chamber to the vacuum side of the vacuum chamber, and the rod may be operable to be rotatably movable about an axis within the hollow tube. When the rod is moved, the outer circumference of the rod may maintain contact with the inner circumference of the first O-ring.

The rod may have a first end adapted to secure to an object located within the vacuum chamber, and the rod may be operable to linearly and rotatably move said object secured to the first end of the rod within the vacuum chamber by manipulating a second end of the rod.

The vacuum fitting may be welded to the hollow tube and may be a standard Klein Flansche (KF) vacuum fitting. The first O-ring may be a low abrasion O-ring. The vacuum chamber may also include a second O-ring that may be a low abrasion O-ring. The hollow tube may have a second recess located within the inner circumference that may be configured to capture the second O-ring. The outer circumference of the rod may be configured to contact an entirety of an inner circumference of the second O-ring When the rod is moved, the outer circumference of the rod may maintain contact with the inner circumference of the second O-ring. The first O-ring and the second O-ring may be low abrasion O-rings. The feedthrough also include a cavity defined by the first O-ring, the second O-ring, an inner side of a side wall of the hollow tube, and an outer side of the rod.

The feedthrough may further include an aperture extending through an entirety of the side wall of the hollow tube at a portion of the side wall defining the cavity. The feedthrough may yet further include a lubricant carried within the cavity. The aperture may be configured to allow the lubricant to be added into the cavity via the aperture. The first end of the rod may be either tapped or tapered.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
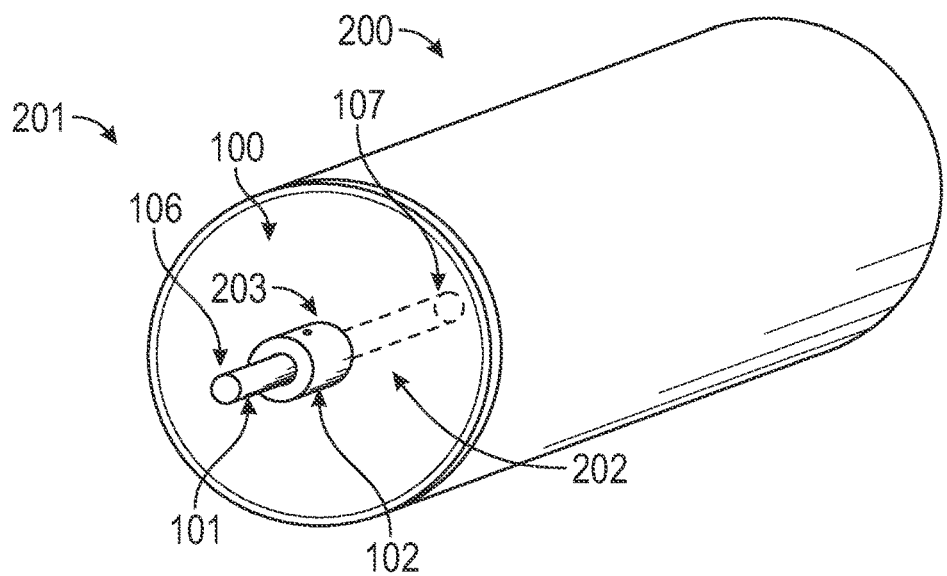
FIG. 1 is a perspective view of the motion feedthrough in combination with a vacuum chamber in accordance with an embodiment of the invention.
Figure 2:
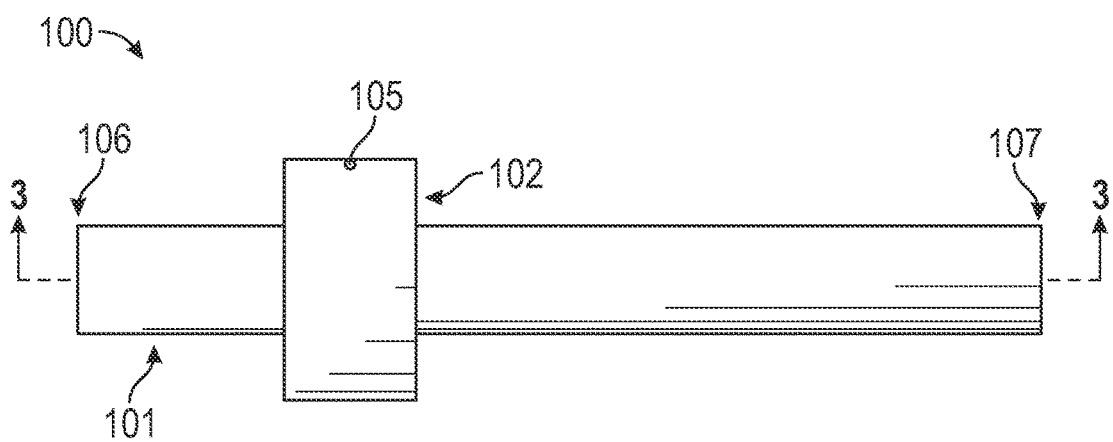
FIG. 2 is a side elevation view of the motion feedthrough of FIG. 1.
Figure 3:
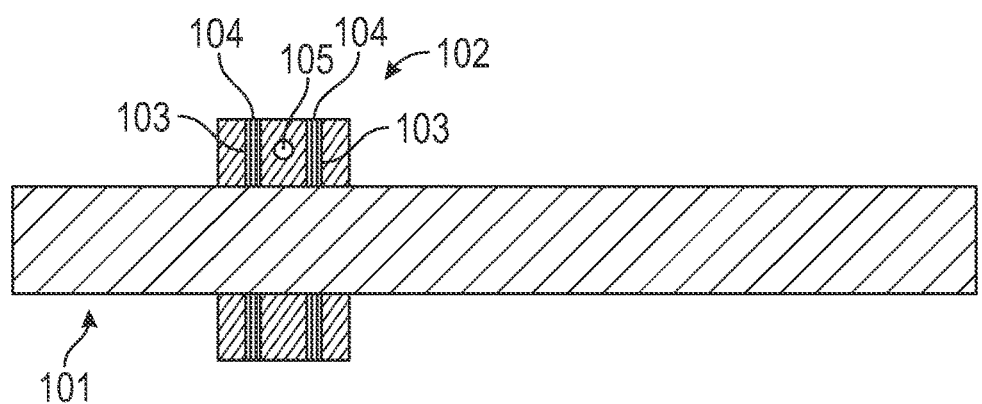
FIG. 3 is a cross-section view of the tube of the motion feedthrough taken through line 3-3 of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a motion feedthrough 100 for a vacuum chamber 200. The motion feedthrough 100 may be configured to allow linear and rotary motion to be transmitted from the ambient side 201 to the vacuum side 202 of a vacuum chamber 200.

The inventive motion feedthrough 100 may include a steel rod 101, which may be hardened, ground, or polished stainless steel. The steel rod 101 may pass through a tube 102 welded to a vacuum fitting 203. The tube 102 may be stainless steel. The vacuum fitting 203 may be a standard Klein Flansche (KF) vacuum fitting. The tube 102 may have one or more grooves 103 in its inner diameter. In one embodiment, there may be two grooves 103 in the inner diameter of the tube 102. Each of the grooves 103 may be adapted to carry an O-ring 104. The O-rings 104 may be low abrasion O-rings. The grooves 103 may be configured to position the O-rings 104 proximate to one another. In one embodiment, the O-rings 104 may create a cavity between them along an entirety of the perimeter of the O-rings 104 when positioned in the grooves 103. A grease port 105 may be tapped into the side wall of the tube 102.

The steel rod 101 may have a proximate end 106, which remains outside of the vacuum chamber 200, and a distal end, which may enter the vacuum chamber 200. Both or either of the proximate end 106 and the distal end 107 may be tapered or tapped. Either end 106, 107 may be tapered to allow for installation or the rod 101 through the tube 102. Either end 106, 107 may be tapped to allow the rod 101 to attach to various implements.

An O-ring 104 may be positioned in each of two grooves 103 in the inner diameter of the tube 102 and the cavity between the O-rings 104 may be filled with a lubricant, which may be, but is not limited to, grease. The lubricant may be introduced to the inner diameter of the tube 102 using the grease port 105, which may be located between two grooves 103.

Prior to operation of the motion feedthrough, the steel rod 101 may be inserted into the tube 102 and may be driven back and forth through the O-rings 104 carried by the tube 102 to ensure proper distribution of the lubricant along the steel rod 101 and to break the static friction between the steel rod 101 and the tube 102.

The distal end 107 of the steel rod 101 may be secured to an object within the vacuum chamber 200. The proximate end 106 of the steel rod 101 may be manipulated outside of the vacuum chamber 200 to allow linear and rotary motion of the object secured to the steel rod 101. The seal between the steel rod 101 and the tube 102 allows the object to be simultaneously moved linearly and rotationally.

The motion feedthrough 100 could be used by several industries employing vacuum chambers.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A vacuum chamber comprising:
   an ambient side; and a vacuum side;
wherein the vacuum chamber is configured to carry a feedthrough;
wherein the feedthrough comprises:
   a hollow tube having a length, an inner circumference, and a first recess located within the inner circumference;
   a first O-ring captured by the first recess within the hollow tube;
   a rod extending through an entirety of the length of the hollow tube, wherein an outer circumference of the rod is configured to contact an entirety of an inner circumference of the first O-ring; and
   a vacuum fitting having an inner circumference fixedly secured to the hollow tube, and an outer circumference fixedly secured to the vacuum chamber;
   wherein the rod is operable to be linearly movable within the hollow tube between the ambient side of the vacuum chamber to the vacuum side of the vacuum chamber;
   wherein the rod is operable to be rotatably movable about an axis within the hollow tube;
   wherein when the rod is moved, the outer circumference of the rod maintains contact with the inner circumference of the first O-ring;
   wherein a first end of the rod is adapted to secure to an object located within the vacuum chamber; and
   wherein the rod is operable to linearly and rotatably move said object secured to the first end of the rod within the vacuum chamber by manipulating a second end of the rod.

2. The vacuum chamber according to claim 1 wherein the vacuum fitting is welded to the hollow tube.

3. The vacuum chamber according to claim 1 wherein the vacuum fitting comprises a standard KF vacuum fitting.

4. The vacuum chamber according to claim 1 further comprising:
   a second O-ring;
   wherein the hollow tube has a second recess located within the inner circumference and configured to capture the second O-ring;
   wherein the outer circumference of the rod is configured to contact an entirety of an inner circumference of the second O-ring; and
   wherein when the rod is moved, the outer circumference of the rod maintains contact with the inner circumference of the second O-ring.

5. The vacuum chamber according to claim 4 wherein the first O-ring and the second O-ring comprise low abrasion O-rings.

6. The vacuum chamber according to claim 4 wherein the feedthrough further comprising a cavity defined by the first O-ring, the second O-ring, an inner side of a side wall of the hollow tube, and an outer side of the rod.

7. The vacuum chamber according to claim 6 wherein the feedthrough further comprises an aperture extending through an entirety of the side wall of the hollow tube at a portion of the side wall defining the cavity.

8. The vacuum chamber according to claim 7 wherein the feedthrough further comprising a lubricant carried within the cavity; wherein the aperture is configured to allow the lubricant to be added into the cavity via the aperture.

9. The vacuum chamber according to claim 1 wherein a first end of the rod is at least one of tapped and tapered.

10. A feedthrough configured to be carried by a vacuum chamber, the feedthrough comprising:
   a hollow tube having a length, an inner circumference, and a first recess located within the inner circumference;
   a first O-ring captured by the first recess within the hollow tube;
   a rod extending through an entirety of the length of the hollow tube, wherein an outer circumference of the rod is configured to contact an entirety of an inner circumference of the first O-ring; and
   a vacuum fitting having an inner circumference fixedly secured to the hollow tube;
   wherein the rod is operable to be linearly movable within the hollow tube;
   wherein the rod is operable to be rotatably movable about an axis within the hollow tube;
   wherein when the rod is moved, the outer circumference of the rod maintains contact with the inner circumference of the first O-ring;
   wherein a first end of the rod is adapted to secure to an object; and
   wherein the rod is operable to linearly and rotatably move said object secured to the first end of the rod by manipulating a second end of the rod.

11. The feedthrough according to claim 10 wherein the vacuum fitting is welded to the hollow tube.

12. The feedthrough according to claim 10 further comprising a cavity defined by the first O-ring, the second O-ring, an inner side of a side wall of the hollow tube, and an outer side of the rod.

13. The feedthrough according to claim 10 further comprising an aperture extending through an entirety of the side wall of the hollow tube at a portion of the side wall defining the cavity.

14. The feedthrough according to claim 13 further comprising a lubricant carried within the cavity; wherein the aperture is configured to allow the lubricant to be added into the cavity via the aperture.

15. The feedthrough according to claim 10 wherein the first end of the rod is at least one of tapped and tapered.

16. The feedthrough according to claim 10 further comprising:
   a second O-ring;
   wherein the hollow tube has a second recess located within the inner circumference and configured to capture the second O-ring;
   wherein the outer circumference of the rod is configured to contact an entirety of an inner circumference of the second O-ring; and
   wherein when the rod is moved, the outer circumference of the rod maintains contact with the inner circumference of the second O-ring.

17. The feedthrough according to claim 16 wherein the first O-ring and the second O-ring comprise low abrasion O-rings.

18. The feedthrough according to claim 10 wherein the vacuum fitting comprises a standard KF vacuum fitting.

19. A method for manipulating an object within a vacuum chamber using a feedthrough, the vacuum chamber having an ambient side and a vacuum side, wherein the vacuum chamber is configured to carry a feedthrough and wherein the feedthrough comprises a hollow tube having a length, an inner circumference, and a first recess located within the inner circumference, a first O-ring captured by the first recess within the hollow tube, a rod extending through an entirety of the length of the hollow tube, a vacuum fitting having an inner circumference fixedly secured to the hollow tube, and an outer circumference fixedly secured to the vacuum chamber, the method comprising:

operating the rod to be linearly movable within the hollow tube between the ambient side of the vacuum chamber to the vacuum side of the vacuum chamber;

operating the rod to be rotatably movable about an axis within the hollow tube;

maintaining contact of the outer circumference of the rod with the inner circumference of the first O-ring;

securing a first end of the rod to an object located within the vacuum chamber;

operating the rod to linearly and rotatably move the object secured to the first end of the rod within the vacuum chamber by manipulating a second end of the rod.

20. The method according to claim 19 further comprising inserting the first end of the rod that the object is attached to into the vacuum chamber via the hollow tube towards the ambient side of the vacuum chamber.

21. The method according to claim 19 further comprising depressurizing the vacuum chamber to create a vacuum.

22. The method according to claim 19 further comprising repressurizing the vacuum chamber; removing the rod from the vacuum chamber by linearly moving the second end of the rod directionally away from an ambient side of the vacuum chamber until the first end of the rod exits from the hollow tube so that the object is removed from the vacuum chamber; and recapturing the object by detaching the object from the first end of the rod.

23. The method according to claim 19 wherein the vacuum fitting is welded to the hollow tube; and wherein the vacuum fitting comprises a standard KF vacuum fitting.

24. The method according to claim 19 wherein the feedthrough further comprises a second O-ring, wherein the hollow tube has a second recess located within the inner circumference and configured to capture the second O-ring, wherein the outer circumference of the rod is configured to contact an entirety of an inner circumference of the second O-ring, and wherein the method further comprises:

operating the rod to be linearly movable within the hollow tube between the ambient side of the vacuum chamber to the vacuum side of the vacuum chamber;

operating the rod to be rotatably movable about an axis within the hollow tube;

wherein when the rod is moved, the outer circumference of the rod maintains contact with the inner circumference of the second O-ring.

25. The method according to claim 24 wherein the first O-ring and the second O-ring comprise low abrasion O-rings.

26. The method according to claim 24 wherein the feedthrough further comprises a cavity defined by the first O-ring, the second O-ring, an inner side of a side wall of the hollow tube, and an outer side of the rod.

27. The method according to claim 26 wherein the feedthrough further comprising an aperture extending through an entirety of the side wall of the hollow tube at a portion of the side wall defining the cavity.

\* \* \* \* \*